United States Patent
Gross et al.

[11] Patent Number: 6,102,987
[45] Date of Patent: Aug. 15, 2000

[54] PROCESS FOR THE REMOVAL OF $CO_2$ AND SULFUR COMPOUNDS FROM INDUSTRIAL GASES, IN PARTICULAR FROM NATURAL GAS AND RAW SYNTHESIS GAS

[75] Inventors: Manfred Gross, Dorsten; Bärbel Kolbe, Witten; Johannes Menzel, Oberhausen; Werner Pohl, Essen, all of Germany

[73] Assignee: Krupp Uhde GmbH, Dortmund, Germany

[21] Appl. No.: 09/162,898

[22] Filed: Sep. 29, 1998

[30] Foreign Application Priority Data

Dec. 5, 1997 [DE] Germany .............................. 197 53 903

[51] Int. Cl.⁷ .............................. B01D 47/06; B01D 53/14
[52] U.S. Cl. .................................. 95/172; 95/181; 95/183; 95/192; 95/193; 95/235; 95/236
[58] Field of Search ..................... 95/159, 160, 161, 95/163, 165, 166, 169, 172, 173, 174, 176, 177, 178, 179, 180, 181, 183, 186, 187, 191, 192, 193, 194, 199, 235, 236, 208, 209, 211, 213

[56] References Cited

U.S. PATENT DOCUMENTS

| | | | |
|---|---|---|---|
| 3,362,133 | 1/1968 | Kutsher et al. | 95/163 |
| 3,555,782 | 1/1971 | Deringer | 95/236 |
| 3,760,564 | 9/1973 | Alders et al. | 95/177 |
| 3,773,896 | 11/1973 | Preusser . | |
| 4,050,909 | 9/1977 | Ranke | 95/236 |
| 4,080,424 | 3/1978 | Miller Loren et al. . | |
| 4,184,855 | 1/1980 | Butwell et al. | 95/236 |
| 4,324,567 | 4/1982 | Ranke et al. | 95/236 |
| 4,345,918 | 8/1982 | Meissner Herman . | |
| 4,530,704 | 7/1985 | Fowler Allan et al. . | |
| 4,545,965 | 10/1985 | Gazzi Luigi et al. . | |
| 4,548,620 | 10/1985 | Albiol | 95/236 |
| 4,556,546 | 12/1985 | Burgoyne, Jr. et al. | 95/161 |
| 4,702,898 | 10/1987 | Grover | 95/236 |
| 4,971,607 | 11/1990 | Gazzi et al. | 95/236 |
| 5,797,981 | 10/1998 | Collin et al. | 95/174 |

FOREIGN PATENT DOCUMENTS

| | | |
|---|---|---|
| 0 207 199 | 1/1987 | European Pat. Off. . |
| 0 558 019 | 9/1997 | European Pat. Off. . |
| 0920901 | 6/1999 | European Pat. Off. . |
| 2 167 397 | 5/1986 | United Kingdom . |
| 2 167 738 | 6/1986 | United Kingdom . |

*Primary Examiner*—Duane S. Smith
*Attorney, Agent, or Firm*—Herbert Dubno

[57] ABSTRACT

A process for the removal of $CO_2$ and sulfur compounds from natural gas and raw synthesis gas wherein N-formylmorpholine and N-acetylmorpholine mixtures are used as the desorbent at temperatures between $-20°$ C. and $+40°$ C. at pressures of 10 to 150 bar in a scrubbing operation. The acid gases are removed from the absorbent by flashing and the regenerated absorbent is recycled to the absorbent.

17 Claims, 2 Drawing Sheets

PROCESS FOR THE REMOVAL OF CO₂ AND SULFUR COMPOUNDS FROM INDUSTRIAL GASES, IN PARTICULAR FROM NATURAL GAS AND RAW SYNTHESIS GAS

FIELD OF THE INVENTION

The present invention relates to a process for the removal of $CO_2$ and sulfur compounds from industrial gases, in particular from natural gas and raw synthesis gas, in which the gas to be treated is freed from acid gas components by absorption using morpholine derivatives at a working pressure of 10 to 150 bar, the absorbent loaded with acid gas components then being regenerated and recycled to the absorber. The term "sulfur compounds" as used here means $H_2S$ in particular, as well as organic sulfur compounds contained in natural gas and raw synthesis gas. The acid gas components, which, as interfering components can also be removed from the industrial gas by absorption, include HCN and water vapor.

BACKGROUND OF THE INVENTION

Natural gas mainly consists of methane which is also accompanied by other substances, some of which are of a similar nature, i.e. organic, while others are completely different and influence the properties of the natural gas accordingly. Depending on its geological source, a natural gas can also contain a disruptive concentration of acid gas components which must be separated before the natural gas can be made available for commercial use. The extent to which a component is deemed to interfere depends on the individual component. $CO_2$ is often tolerated up to approx. 2% by vol. $H_2S$ is highly toxic, and at the high pressure levels used for handling natural gas, even low concentrations can cause harmful corrosion. This can ultimately lead to hydrogen-induced stress crack corrosion which can cause gas pipelines to burst. Therefore, as a rule, only a few ppm can be permitted. The allowable limit for less harmful organic sulfur compounds, which are also formed in small quantities when $H_2S$ and $CO_2$ are present, is usually higher by 1 to 2 powers of ten.

The use of formylmorpholine (NFM) as an absorbent for $H_2S$ and $CO_2$ is known from U.S. Pat. No. 3,773,896. 70 to 80% of the absorbed sulfur compounds and 55 to 65% of the absorbed $CO_2$ can be separated from the absorbent using thermal regeneration at a temperature of 80° C. The limited desorption of the dissolved gas from the loaded absorbent has a detrimental effect as the gas portions remaining in the solution impede the absorption of the gases from the raw gas and do not allow any low residual concentrations in the treated gas. Furthermore, separation of the acid gas components requires higher absorbent circulation.

A large number of other physical absorbents and chemical absorbents for separating $CO_2$ and $H_2O$ from industrial gases, especially from natural gases, are known (A. Kohl et al., "Gas Purification", 4th edition 1985; Stephen A. Newman, "Acid and Sour Gas Treating Processes", Gulf Publishing Comp., 1985). Physical absorbents include selexol, propylene carbonate and methanol. One disadvantage of these common absorbents is, however, that a considerable portion of useful components is also absorbed from the gas. This especially applies to natural gases from which methane and higher hydrocarbons are also absorbed. Part of the hydrocarbons dissolved in the absorbent can be released by flashing and then recovered by compressing the gas stream released during flashing and recycling it to the raw gas stream prior to its entry into the absorber. Recycling, however, requires additional energy for the compression of the gas stream and enlarges the volume flow passed on to the absorber. As a result, the energy efficiency ratio of the process deteriorates. Chemical absorbents include ethanolamines and alkali salt solutions. Chemical absorbents require considerably more energy for regeneration than physical absorbents, and it is not economically feasible to use them for the removal of organic sulfur compounds from raw gas. Furthermore, some chemical absorbents are very corrosive so that corrosion inhibitors have to be added or plants have to be fabricated from special anticorrosive materials.

When natural gases with a high $CO_2$ content, which can be as high as 40% by vol., are treated, correspondingly large amounts of released $CO_2$ are obtained and passed into underground gas holders, usually at a pressure of 200 to 400 bar to prevent emissions. The acid gas obtained during desorption, which has a pressure of 1 to 2 bar, is compressed in compressors until it reaches the pressure required for the aquifer storage. Operating and investment costs can be reduced if the acid gases can be separated from the absorbent at a higher working pressure.

OBJECTS OF THE INVENTION

It is the principal object of the invention to provide a process which ensures selective separation of the acid gas components, especially $CO_2$ and sulfur compounds, from an industrial gas containing hydrocarbons while ensuring high absorption capacity.

Another object of the invention is to provide an improved process for the separation of acid gas components and especially $CO_2$ and sulfur compounds from material gas and raw synthesis gas, whereby drawbacks of earlier systems are avoided.

It is another object of the invention to improve the economics of absorption treatment of industrial gases so as to render the removal of $CO_2$ and sulfur compounds from such gases more efficient.

SUMMARY OF THE INVENTION

To achieve this object, the invention uses a mixture of N-formyl morpholine (NFM) and N-acetyl morpholine (NAM) as an absorbent at a temperature of –20° C. to +40° C. in an absorber. The volumetric ratio of the mixture (reference value: 100) ranges from 10 to 90 mass parts NFM and 90 to 10 mass parts NAM. A preferred embodiment of the present invention sees the absorbent containing 30 to 70 mass parts NFM and 70 to 30 mass parts NAM made up of a total of 100 mass parts. The absorbent can also contain 0.1 to 5 mass parts $H_2O$. The invention is based on the finding that at low temperatures within the indicated temperature range the absorbent mixture of N-formyl morpholine and N-acetyl morpholine used in the present invention shows surprisingly high acid gas solubility, while the methane and higher hydrocarbon solubility is particularly low.

These objects and others which will become apparent hereinafter are attained, in accordance with the invention by a process which comprises the steps of:

(a) scrubbing the industrial gas in an absorber with an absorbent consisting essentially of a mixture of N-formylmorpholine and N-acetylmorpholine at a temperature between –20° C. and 40° C. at a working pressure of 10 to 150 bar;

(b) withdrawing a spent absorbent laden with absorbed acid gas components from the absorber;

(c) regenerating the spent absorbent laden with absorbed acid gas components to form a regenerated absorbent; and (d) recycling the regenerated absorbent to the absorber.

The ratio of the mixture of N-formyl morpholine and N-acetyl morpholine allows $H_2O$, $CO_2$, and, if required, other acid gas components to be absorbed at low temperatures, i.e. as low as $-20°$ C., without the absorbent solidifying or crystallizing. The low temperatures used in accordance with the present invention cause superproportional $H_2S$ and $CO_2$ loads to be produced in the absorbent solution. It is thus possible to operate with low absorbent circulation which has a positive effect on energy and investment costs. In addition, the process covered by the present invention allows the absorbent a higher degree of regeneration. Surprisingly, the thermal regeneration of the absorbent at temperatures of less than $80°$ C. enables approximately 85 to 99% of the $H_2S$ and 70 to 99.9% of the $CO_2$ dissolved in the absorbent to be desorbed. The raw gas can be treated to such an extent that only residual contents of 1 ppm by vol. $H_2S$ and 10 ppm by vol. $CO_2$ remain.

The process according to the present invention is especially suited to industrial gases with a high acid gas content of 10 mol. to 90 mol. %. It is especially used for is treating gases with a $CO_2$ content of more than 20 mol. % and $H_2S$ portions of more than 3 mol. %, as the superproportional acid gas solubility at low temperatures can be used to full effect. According to the present invention, absorption takes place within a temperature range of $-20°$ C. to $+40°$ C. Temperatures of between $-15°$ C. and $+30°$ C. are preferred. The invention prefers a temperature range of $-15°$ C. to $0°C$. if particularly high absorbency is required.

Absorbers with bulk packing, structured packing or trays are preferred. The absorbent should be subjected to intermediate cooling in the absorber to dissipate the absorption heat. For this purpose, the invention provides for at least one liquid bleed stream to be withdrawn on a level with an intermediate tray, cooled and then returned to the absorber below the intermediate tray.

Several process variants can be used to regenerate the absorbent loaded with acid gas components. Process selection depends on the acid gas concentration which can be tolerated in the clean gas.

An embodiment of the process according to the present invention provides for the absorbent loaded with acid gas components to be withdrawn from the bottom of the absorber, to be heated and then passed to a flash vessel operated at increased pressure not in excess of the working pressure of the absorber. An acid gas stream at flash vessel pressure is released in the flash vessel and used for preheating the absorbent stream withdrawn from the absorber bottom. For regeneration purposes, the absorbent from the flash vessel is allowed to expand into a desorber which is operated at lower pressure, heated and/or supplied with stripping steam or stripping gas. Once the absorbent has been thermally regenerated in the desorber, it can be cooled in a heat exchange process involving the loaded absorbent fed to the flash vessel, and, after being cooled even further to attain the working temperature required for the absorber, the absorbent can be fed to the absorber. To avoid absorbent losses, the acid gas streams leaving the top of the flash vessel and the desorber should be partially condensed and the condensate obtained should then be returned to the absorbent circulation system. The process variant described allows the major part of the acid gas dissolved in the absorbent to be released at pressures close to the absorption pressure. This is of particular advantage if the acid gas under pressure is to be fed into underground gas holders. In addition, as a result of the desorption and thermal regeneration which follow the expansion in the flash vessel, the process variant described allows $H_2S$, $CO_2$ and organic sulfur components to be almost completely removed from the raw gas containing acid gas. All but a few ppm by vol. of the acid gas components can be removed.

Another process variant of the present invention provides for the absorbent to be freed from its acid gas components and cooled by multi-stage flashing in an arrangement of several flash vessels connected in series. Another embodiment of the invention provides for the absorbent, which has been cooled in the flash vessels, to pass through coolers in which the absorbent from the absorber undergoes intermediate cooling during absorption and/or the gas to be treated is cooled prior to entering the absorber. The process variant described is particularly to be recommended if higher content levels of acid gas components are permitted in the clean gas. It is also suitable for regenerating natural gas with a high $CO_2$ content so that the natural gas meets pipeline specifications which allow, for example, approx. 2% by vol. $CO_2$. When the absorbent is flashed, desorption heat is removed and used for the desorption of the dissolved gases. This effect is used for cooling the absorbent. The process of multi-stage flashing allows the absorbent to be recooled to the low temperatures required by the process without involving the additional installation of a refrigeration unit.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
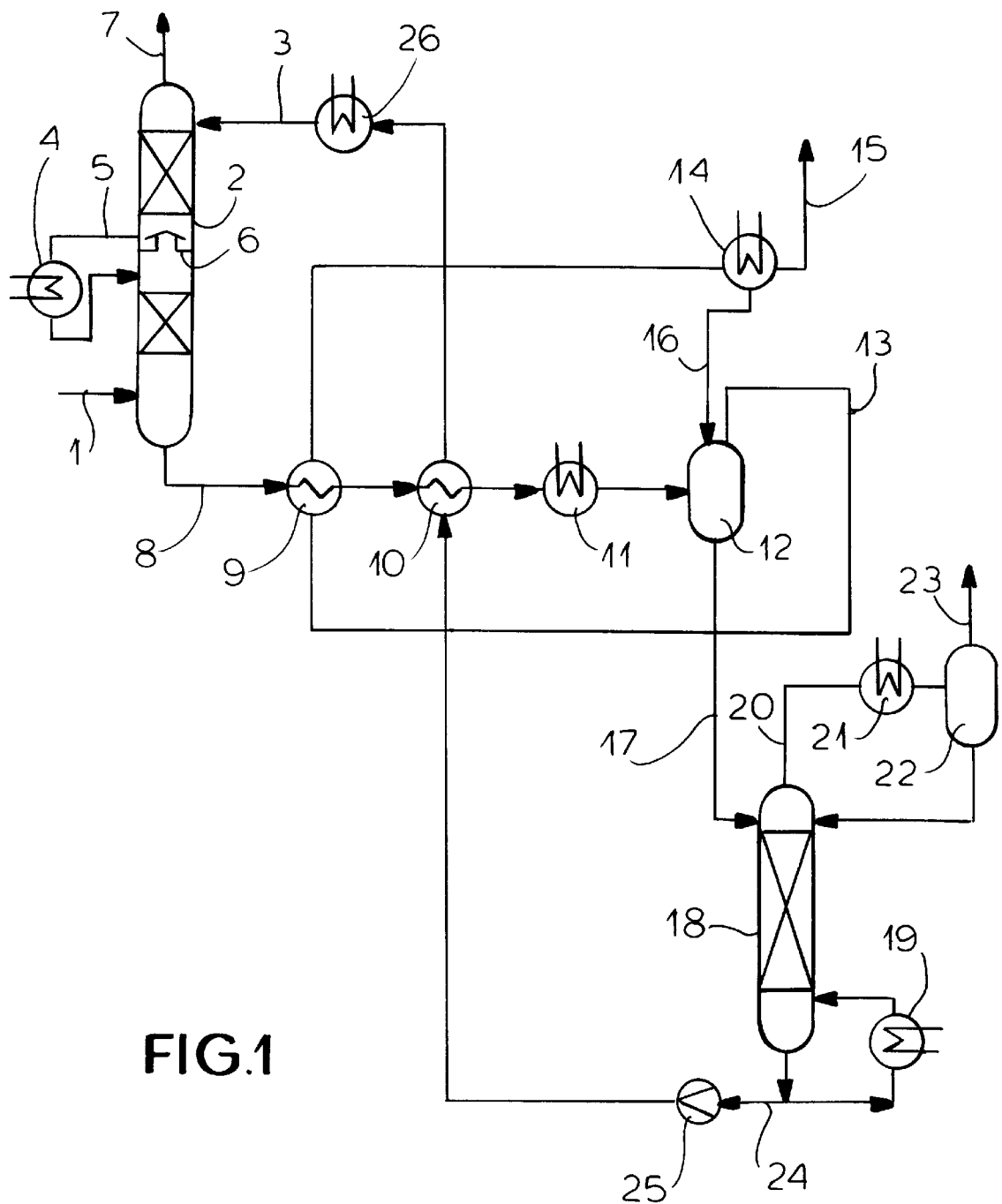
FIG. 1 shows the plant layout for implementing the process according to the present invention.
Figure 2:
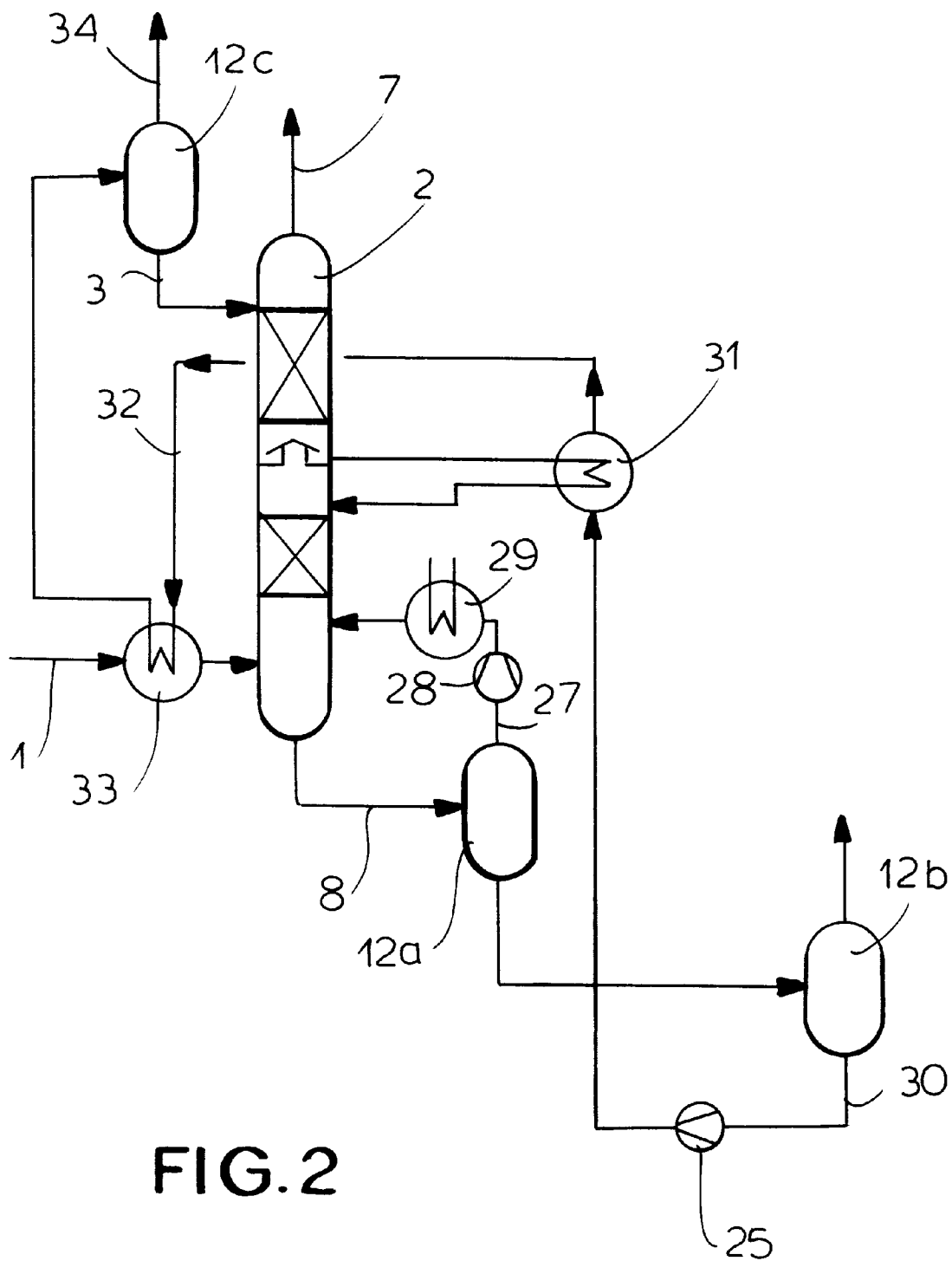
FIG. 2 shows the plant layout in another embodiment of the process according to the present invention.

The process represented in FIGS. 1 and 2 is used to remove acid gas components, especially $CO_2$, $H_2S$ and organic sulfur compounds, from industrial gases containing hydrocarbons, e.g. natural gas. The gas to be treated 1 is freed from its acid gas components by absorption in an absorber 2 at the working pressure at 10 to 150 bar. A mixture of N-formyl morpholine (NFM) and N-acetyl morpholine (NAM) is used as an absorbent. The ratio of the mixture (reference value: 100) may vary between 10 to 90 mass parts NFM and 90 to 10 mass parts NAM, made up of a total of 100 mass parts (parts by weight). Preferably the absorbent contains 30 to 70 parts NFM and 70 to 30 mass parts NAM, complementing one another to form a total of 100 parts by weight. The absorbent can also contain 0.1 to 5 mass parts $H_2O$. The absorbent is fed via line 3 to the head of the absorber 2 which is in the form of an absorption column equipped with bulk packing, structured packing or trays. Absorption is implemented at a temperature of $-20°$ C. to $+40°$ C., the preferred temperature range lying between $-15°$ C. and $30°$ C. The absorbent loaded with acid gas components is regenerated and recycled to the absorber.

In the process variant shown in FIG. 1, a raw gas stream 1 which can have an acid gas content of between 50 and 90% by vol. is fed into the bottom of the absorber 2. The acid gas components contained in the raw gas are absorbed in reverse flow by an absorbent mixture of NFM and NAM. To dissipate the absorption heat, one or several intermediate coolers 4 are provided to cool the absorbent solution discharged from the absorption column 2. The absorbent to be cooled is withdrawn as a liquid bleed stream 5 on a level with the intermediate tray 6 in the absorber 2, cooled and then returned to the absorber 2 below the intermediate tray 6.

The treated gas 7 is withdrawn at the head of the absorber 2. The absorbent which is loaded with acid gas components, is withdrawn from the bottom of the absorber 2, heated in heat exchangers 9, 10, 11 and fed to a flash vessel 12, which is operated at elevated pressure not in excess of the working pressure in the absorber 2. The pressure adjusted in flash vessel 12 should only be slightly below the working pressure of the absorber 2.

The acid gases dissolved are separated by intensive preheating of the absorbent 8. This allows the major part of the acid gas dissolved in the absorbent 8 to be flashed at a pressure equal to or only slightly below the working pressure of the absorber 2 depending on the acid gas concentration in the raw gas stream 1. The acid gas stream 13 leaving the flash vessel 12 is used for preheating the loaded absorbent stream 8 in the heat exchanger 9. It is then cooled in a cooler 14 for possible compression to a pressure of between 200 and 400 bar required for feeding the gas into underground gas holders, and is then passed on as an acid gas stream 15. The vaporous solvent contained in the acid gas stream 15 is condensed off and returned to the absorbent circulation as condensate stream 16. The absorbent 17, loaded with residual gas components, is depressurized in a desorber 18 ready for further regeneration. The residual part of the acid gases is released.

A column equipped with bulk packing, structured packing or trays should be used for desorption. Vapor or another suitable heat transfer fluid is used indirectly for the thermal regeneration of the absorbent in a reboiler 19. The vapor phase 20, which is rich in acid gas and which is withdrawn at the head of the desorption column 18, is cooled in a condenser 21. Vapor and liquid phase are separated in a separator 22. Vapor is discharged at liquid 23. The phase is returned to the head of the desorption column 18 and the acid gas stream is available for further processing or is passed into underground gas holders.

The absorbent solution 24 which has been almost completely regenerated with regard to the acid gas components dissolved therein, is withdrawn at the bottom of the desorption column 18 and returned to the absorption column 2 by means of a circulation pump 25. The heat from the hot, regenerated solution 24 is transferred to the loaded absorption stream 8 in the heat exchanger 10. Before the absorbent 24 enters the absorber 2, it is cooled to the specified absorption temperature of −20° C. to +40° C. in a cooler 26, so that the absorbent, which is now cooled and regenerated, can start removing acid gas components again in the absorber 2.

In the process variant shown in FIG. 2, the absorbent 8, which is loaded with acid gas components and which is withdrawn from the bottom of the absorber 2, is freed from the acid gas components by multi-stage flashing in an arrangement of several flash vessels connected in series 12a, 12b, 12c while being cooled at the same time.

The loaded absorbent 8 is passed to a flash vessel 12a, the working pressure of which is such that a gas phase 27, which mainly contains hydrocarbons, is produced when the absorbent is flashed into this vessel 12a. This gas phase is compressed at 28 to the working pressure of the absorber 2 and recycled to the absorber 2 after having been cooled in the heat exchanger 29.

The selection of the flash pressure in the second flash vessel 12b ensures that the absorbent 30 withdrawn from flash vessel 12b is cooled considerably. The absorbent 30 withdrawn from flash vessel 12b is used for the intermediate cooling of the absorbent solution contained in the absorber 2. Heat exchange takes place in an intermediate cooler 31 as represented in FIG. 1.

The preheated and partly loaded absorbent 32 leaving the intermediate coolers 31 can be subsequently used for pre-cooling the raw gas 1 in the precooler 33. The partly loaded absorbent 32 is then allowed to expand in another flash vessel 12c before entering the absorber 2. During its expansion, the absorbent is cooled to the working temperature required for absorption and freed from its residual acid gas components which are withdrawn as an acid gas stream 34 at the head of the flash vessel. The regenerated and cooled absorbent leaving the flash vessel 12c via line 3 is fed back to the head of the absorption column 2 where it is made available again for removing acid gas components from raw gas 1.

We claim:

1. A process for the removal of $CO_2$ and sulfur compounds from an industrial gas selected from the group which consists of natural gas and raw synthesis gas, comprising the steps of:

(a) scrubbing said industrial gas in an absorber with an absorbent consisting essentially of a mixture of N-formylmorpholine and N-acetylmorpholine at a temperature between −20° C. and 40° C. at a working pressure of 10 to 150 bar;

(b) withdrawing a spent absorbent laden with absorbed acid gas components from said absorber;

(c) regenerating the spent absorbent laden with absorbed acid gas components to form a regenerated absorbent; and (d) recycling the regenerated absorbent to said absorbers, said absorbent consisting essentially of 30 to 70 parts by weight N-formylmorpholine and 70 to 30 parts by weight N-acetylmorpholine, per 100 parts by weight of the absorbent and containing 0.1 to 5 parts by weight $H_2O$.

2. The process defined in claim 1 wherein said temperature is −15° C. to 30° C.

3. The process defined in claim 2 wherein said absorbent is provided with a packing, said process further comprising withdrawing a liquid bleed stream from the absorber at an intermediate location of the height of the packing, cooling the liquid bleed stream and returning the cooled liquid bleed stream to said absorber below said location.

4. The process defined in claim 3 wherein said packing is formed by a multiplicity of horizontal trays in said absorber and the liquid bleed stream is withdrawn at a level of an intermediate one of said trays and is returned below said intermediate one of said trays.

5. The process defined in claim 4 wherein the spent absorbent loaded with acid gas components is withdrawn from a bottom of the absorber, is heated and is introduced into a flash chamber operated at an elevated pressure not in excess of said working pressure, an acid gas released in said flash chamber being used to preheat the absorbent withdrawn from the bottom of the absorber, absorbent from said flash chamber being expanded in a desorber operated at a low pressure, heated and/or supplied with stripping steam or stripping gas, said absorbent being thermally regenerated in said desorber.

6. The process defined in claim 5, further comprising the steps of cooling the absorbent thermally regenerated in said desorber in heat exchange with absorbent fed to said flash chamber, and recycling said regenerated absorbent to said absorber after it has been cooled to said temperature.

7. The process defined in claim 6, further comprising the step of partially condensing an acid gas stream from a head of said flash chamber and from said desorber to produce a condensate, and recycling said condensate to said absorber.

8. A process for the removal of $CO_2$ and sulfur compounds from an industrial gas selected from the group which consists of natural gas and raw synthesis gas, comprising the steps of:
   (a) scrubbing said industrial gas in an absorber with an absorbent consisting essentially of a mixture of N-formylmorpholine and N-acetylmorpholine at a temperature between −20° C. and 40° C. at a working pressure of 10 to 150 bar;
   (b) withdrawing a spent absorbent laden with absorbed acid gas components from said absorber;
   (c) regenerating the spent absorbent laden with absorbed acid gas components to form a regenerated absorbent;
   (d) recycling the regenerated absorbent to said absorber; and
   (e) subjecting the spent absorbent loaded with acid gas components to multistage flashing in a plurality of flash chambers connected in series, said spent absorbent being simultaneously cooled.

9. The process defined in claim 8 wherein absorbent cooled in said flash chambers is passed through coolers in which the absorbent undergoes intermediate cooling during absorption and/or the gas to be treated is cooled prior to entering said absorber.

10. The process defined in claim 9 wherein the flash pressure of at least one of said flash chambers is such that a gas phase mainly consisting of hydrocarbons is obtained during the expansion into the flash chamber, the gas phase being compressed to said working pressure and being recycled to said absorber after cooling.

11. The process defined in claim 8 wherein said absorbent contains 0.1 to 5 parts by weight $H_2O$ per 100 parts by weight of the absorbent.

12. The process defined in claim 8 wherein said temperature is −15° C. to 30° C.

13. The process defined in claim 8 wherein said absorbent is provided with a packing, said process further comprising withdrawing a liquid bleed stream from the absorber at an intermediate location of the height of the packing, cooling the liquid bleed stream and returning the cooled liquid bleed stream to said absorber below said location.

14. The process defined in claim 13 wherein said packing is formed by a multiplicity of horizontal trays in said absorber and the liquid bleed stream is withdrawn at a level of an intermediate one of said trays and is returned below said intermediate one of said trays.

15. A process for the removal of $CO_2$ and sulfur compounds from an industrial gas selected from the group which consists of natural gas and raw synthesis gas, comprising the steps of:
   (a) scrubbing said industrial gas in an absorber with an absorbent consisting essentially of a mixture of N-formylmorpholine and N-acetylmorpholine at a temperature between −20° C. and 40° C. at a working pressure of 10 to 150 bar;
   (b) withdrawing a spent absorbent laden with absorbed acid gas components from said absorber;
   (c) regenerating the spent absorbent laden with absorbed acid gas components to form a regenerated absorbent;
   (d) recycling the regenerated absorbent to said absorber, the spent absorbent loaded with acid gas components being withdrawn from a bottom of the absorber, heated and introduced into a flash chamber operated at an elevated pressure not in excess of said working pressure, an acid gas released in said flash chamber being used to preheat the absorbent withdrawn from the bottom of the absorber, absorbent from said flash chamber being expanded in a desorber operated at a low pressure, heated and/or supplied with stripping steam or stripping gas, said absorbent being thermally regenerated in said desorber.

16. The process defined in claim 15, further comprising the steps of cooling the absorbent thermally regenerated in said desorber in heat exchange with absorbent fed to said flash chamber, and recycling said regenerated absorbent to said absorber after it has been cooled to said temperature.

17. The process defined in claim 16, further comprising the step of partially condensing an acid gas stream from a head of said flash chamber and from said desorber to produce a condensate, and recycling said condensate to said absorber.

* * * * *